US011840055B2

(12) United States Patent
Abe et al.

(10) Patent No.: US 11,840,055 B2
(45) Date of Patent: Dec. 12, 2023

(54) CONSTRUCTION MEMBER

(71) Applicant: 3M INNOVATIVE PROPERTIES COMPANY, St. Paul, MN (US)

(72) Inventors: Hidetoshi Abe, Yamagata (JP); Koji Saito, Yamagata (JP)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

(21) Appl. No.: 17/264,076

(22) PCT Filed: Aug. 1, 2019

(86) PCT No.: PCT/IB2019/056586
§ 371 (c)(1),
(2) Date: Jan. 28, 2021

(87) PCT Pub. No.: WO2020/026199
PCT Pub. Date: Feb. 6, 2020

(65) Prior Publication Data
US 2021/0370641 A1 Dec. 2, 2021

(30) Foreign Application Priority Data
Aug. 3, 2018 (JP) .................. 2018-146457

(51) Int. Cl.
*B32B 7/12* (2006.01)
*B32B 3/30* (2006.01)
(Continued)

(52) U.S. Cl.
CPC .................. *B32B 7/12* (2013.01); *B32B 3/30* (2013.01); *B32B 27/08* (2013.01); *B32B 27/304* (2013.01);
(Continued)

(58) Field of Classification Search
CPC .. B32B 7/12; B32B 3/30; B32B 27/08; B32B 27/304; B32B 2264/302; B32B 2264/0207; B32B 2264/0214
See application file for complete search history.

(56) References Cited

U.S. PATENT DOCUMENTS

| 4,656,218 A | 4/1987 | Kinoshita |
| 4,994,322 A | 2/1991 | Delgado |

(Continued)

FOREIGN PATENT DOCUMENTS

| JP | 2002-356073 | 12/2002 |
| JP | 2003-311901 | 6/2003 |

(Continued)

OTHER PUBLICATIONS

International Search Report for PCT International Application No. PCT/IB2019/056586, dated Dec. 26, 2019, 3 pages.

*Primary Examiner* — Tamra L. Dicus

(57) ABSTRACT

A construction member of one embodiment of the present disclosure includes a decorative film and a pre-mask: that is laminated to the decorative film and removed alter application of the decorative film is described. The decorative film includes: a transparent resin film having, an embossed first surface and a second surface opposite the first surface; a printed layer disposed on the second surface of the transparent resin: film; and a colored adhesive layer disposed on or above the printed layer. The pre-mask includes: a support film having a first surface and a second, surface opposite: the first surface; and a pressure-sensitive adhesive layer that has an uneven surface and: is disposed on the first, surface of the support film. The first surface of the transparent resin film of the decorative film and the uneven surface of the pressure-sensitive adhesive layer of the pre-mask face each other.

10 Claims, 3 Drawing Sheets

(51) Int. Cl.
*B32B 27/08* (2006.01)
*B32B 27/30* (2006.01)

(52) U.S. Cl.
CPC ............... *B32B 2264/0207* (2013.01); *B32B 2264/0214* (2013.01); *B32B 2264/302* (2020.08)

(56) References Cited

U.S. PATENT DOCUMENTS

| | | |
|---|---|---|
| 5,681,631 A | 10/1997 | Steelman |
| 10,139,530 B2 | 11/2018 | Yamamoto |
| 2006/0032580 A1 | 2/2006 | Thunhorst |
| 2013/0216754 A1 | 8/2013 | Chisaka |
| 2014/0044912 A1 | 2/2014 | Clarke |
| 2014/0322473 A1 | 10/2014 | Lin |
| 2016/0325535 A1* | 11/2016 | Ueno ..................... B32B 27/36 |

FOREIGN PATENT DOCUMENTS

| | | |
|---|---|---|
| JP | 2013-086467 | 5/2013 |
| JP | 5319163 | 10/2013 |
| JP | 2014-046671 | 3/2014 |
| JP | 5933957 | 6/2016 |
| JP | 2017-052818 | 3/2017 |
| JP | 2017-218561 | 12/2017 |
| WO | WO 1997-20008 | 6/1997 |
| WO | WO 2001-000411 | 1/2011 |

\* cited by examiner

CONSTRUCTION MEMBER

TECHNICAL FIELD

The present disclosure relates to a construction member, and in particular, relates to a construction member that includes a decorative film and a pre-mask.

BACKGROUND ART

Decorative films to which a pattern has been imparted by printing or the like are widely used in decorative applications such as on inner walls and outer walls of buildings. In particular, decorative films used in construction applications are desirably non-flammable or flame retardant.

Patent Document 1 (JP 2014-46671 A) discloses a printed structure including a laminate obtained by laminating in the following order, a tacky adhesive layer, a printed layer, and a substrate film, wherein the printed layer is printed using a solvent-based ink, and the substrate film is composed of a vinyl chloride resin composition containing a vinyl chloride resin having an average degree of polymerization of from 600 to 1300, and a plasticizer, and a content of the plasticizer is from 15 to 40 parts by weight per 100 parts by weight of the vinyl chloride resin; the tacky adhesive layer is composed of a tacky adhesive composition containing an acrylic-based tacky adhesive having a weight average molecular weight of from 600000 to 1000000; the laminate has a thickness of from 65 to 160 μm; and a total calorific value of an exothermic test using a cone calorimeter tester and using a 12.5 mm thick plasterboard as a base material is 8 MJ/m² or less.

SUMMARY OF INVENTION

Technical Problem

Ordinary decorative films have a multilayer structure that includes a film that supports a printed layer, a colored film, and a bonding layer for bonding these films. Decorative films having a multilayer structure tend to have an increase in the mass per unit area of combustible components such as resins, and this is disadvantageous with respect to the non-flammability or flame retardancy required in construction applications. When the mass per unit area of the combustible components of the decorative film is reduced in order to improve the non-flammability or flame retardancy, or in other words for example, when the overall layer thickness of the decorative film is reduced, the handling ease of the decorative film may be reduced and high-precision application may not be possible.

When a decorative film is used in an interior or exterior of a building, it is desirable that the surface glossiness (gloss) of the decorative film be low in order to render a pattern such as a wood grain pattern in a more realistic texture.

The present disclosure provides a construction member that enables a decorative film with excellent texture to be applied in decorative applications for buildings.

Solution to Problem

According to an embodiment of the present disclosure, provided is a construction member including: a decorative film, and a pre-mask that is laminated to the decorative film and removed after application of the decorative film; wherein the decorative film includes: a transparent resin film having an embossed first surface and a second surface opposite the first surface, a printed layer disposed on the second surface of the transparent resin film, and a colored adhesive layer disposed on or above the printed layer; the pre-mask includes: a support film having a first surface and a second surface opposite the first surface, and a pressure-sensitive adhesive layer having an uneven surface and being disposed on the first surface of the support film; and the first surface of the transparent resin film of the decorative film and the uneven surface of the pressure-sensitive adhesive layer of the pre-mask face each other.

Advantageous Effects of Invention

The construction member of the present disclosure imparts rigidity to the decorative film by a pre-mask, and therefore provides excellent affixing workability, and since the pre-mask is removed after affixing, a thin decorative film that satisfies the requirement for non-flammability or flame retardancy for construction can be provided. Furthermore, since the uneven surface of the pressure-sensitive adhesive layer of the pre-mask and the embossed surface of the decorative film are adhered facing each other, a decorative film which exhibits excellent texture and for which the embossed surface is favorably maintained can be provided.

Note that the above descriptions should not be construed to mean that all embodiments of the present invention and all merits of the present invention are disclosed.

DESCRIPTION OF EMBODIMENTS

Figure 1:
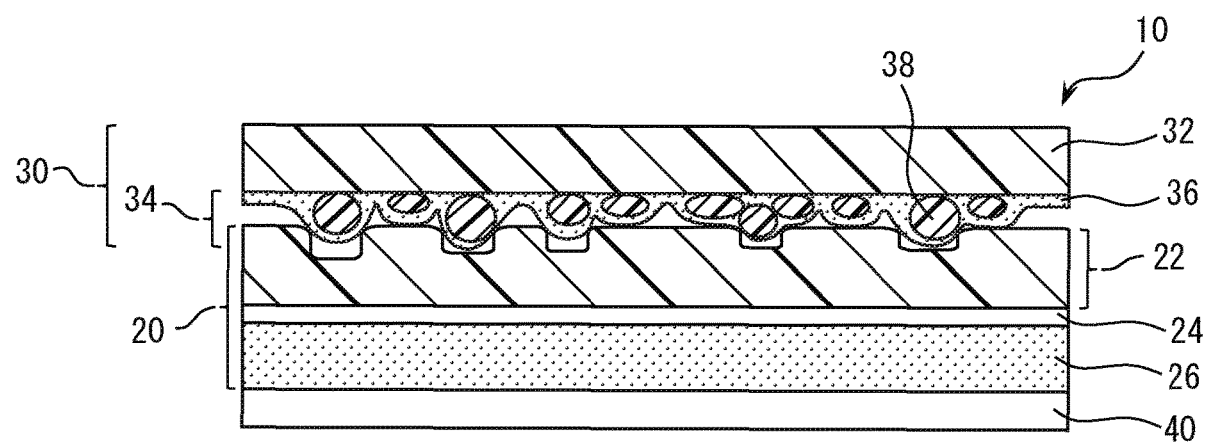
FIG. 1 is a schematic cross-sectional view of a construction member according to one embodiment of the present disclosure.

Representative embodiments of the present invention are described in detail below for the purpose of illustration by example, but the present invention is not limited to these embodiments.

In the present disclosure, "decorative film" refers to a film used in decorative applications, and encompasses articles called sheets.

In the present disclosure, the term "pressure-sensitive adhesiveness" means a property of a material or composition permanently having adhesiveness within a range of the operation temperature, for example, within a range of from 0° C. to 50° C., and being capable of adhering to various surfaces under slight pressure without undergoing phase transition (from liquid to solid).

In the present disclosure, "transparent" means that the total light transmittance of a material or article in a wavelength range of from 400 to 700 nm is approximately 85% or higher, "semi-transparent" means that the total light transmittance of a material or article in a wavelength range of from 400 to 700 nm is from approximately 20% to less than approximately 85%, and "non-transparent" means that the total light transmittance of a material or article in a wavelength range of from 400 to 700 nm is less than approximately 20%. The total light transmittance is determined in accordance with JIS K 7361-1:1997 (ISO 13468-1:1996).

In the present disclosure, "microsphere" means a particle having an average particle size of several hundred micrometers or less, unless otherwise specified. In some suitable embodiments, the microspheres are substantially spherical. Substantially spherical means having a cross-sectional shape corresponding to a circle or ellipse, or having a spherical surface.

The construction member of one embodiment includes a decorative film and a pre-mask laminated to the decorative film. The pre-mask is detached and removed from the decorative film after the decorative film has been applied to an adherend, e.g., an inner or outer wall of a building. Since the construction member includes a pre-mask, the construction member can impart rigidity to the decorative film, and therefore even when the decorative film is thin, good affixing workability can be obtained. In addition, the pre-mask is removed after the decorative film is affixed to an adherend, and therefore the thickness of the decorative film can be reduced, and as a result, excellent non-flammability or flame retardancy can be obtained.

In one embodiment, the decorative film includes: a transparent resin film having an embossed first surface and a second surface opposite the first surface, a printed layer disposed on the second surface of the transparent resin film, and a colored adhesive layer disposed on or above the printed layer. The embossed first surface having unevenness of the transparent resin film becomes the outermost layer when the decorative film is applied to an adherend, and thus a visual effect (matte feel) and a tactile texture (texture) are provided.

A resin film capable of receiving a printed layer formed using inkjet printing, gravure printing, or the like can be used as the transparent resin film. The resin film may include a thermoplastic resin and can be appropriately selected according to the printing method and ink. Examples of the resin film include films containing polyethylene, polypropylene, or other such polyolefins, polystyrene, polyvinyl chloride, polyvinyl acetate, polyethylene terephthalate, or other such polyesters, polyurethane, acrylic resin, acrylic urethane resin, or blends thereof.

In one embodiment, the transparent resin film is a polyvinyl chloride film. The polyvinyl chloride film excels particularly in flame retardancy, and can effectively impart flame retardancy or non-flammability to the decorative film.

The first surface of the transparent resin film is embossed. The embossing may have a variety of uneven patterns such as a wood grain pattern, stone pattern, leather pattern, hairline pattern, marble pattern, and other such geometric patterns. The embossing mayor may not be in phase with an image, graphic, or pattern of the printed layer disposed on the second surface of the transparent resin film. Embossing can be performed on the transparent resin film using a known embossing roller.

The depth of the embossing is less than the thickness of the transparent resin film. The depth of the embossing can generally be set to approximately 1 µm or greater, approximately 2 µm or greater, or approximately 5 µm or greater, and approximately 80 µm or less, approximately 70 µm or less, or approximately 60 µm or less. By setting the embossing depth to the aforementioned range, a high level of texture can be imparted to the decorative film.

The thickness of the transparent resin film can be set to approximately 30 µm or greater, approximately 40 µm or greater, or approximately 50 µm or greater, and approximately 160 µm or less, approximately 140 µm or less, or approximately 120 µm or less. By setting the thickness of the transparent resin film to the range described above, a decorative film excelling in flame retardancy or non-flammability can be obtained.

The mass per unit area of the transparent resin film can be set to approximately 35 g/m$^2$ or greater, approximately 50 g/m$^2$ or greater, or approximately 60 g/m$^2$ or greater, and approximately 190 g/m$^2$ or less, approximately 170 g/m$^2$ or less, or approximately 144 g/m$^2$ or less. By setting the mass per unit area of the transparent resin film to the range described above, a decorative film excelling in flame retardancy or non-flammability can be obtained.

The total light transmittance of the transparent resin film in a wavelength range of from 400 to 700 nm can be approximately 85% or greater, approximately 90% or greater, or approximately 95% or greater, and 100% or less, approximately 99% or less, or approximately 98% or less. By setting the total light transmittance of the transparent resin film to the above-mentioned range, the printed layer disposed on the second surface of the transparent resin film can be vividly viewed from the first surface, that is, the embossed surface of the transparent resin film, and through this, the design performance of the decorative film can be increased.

The printed layer is disposed on the second surface of the transparent resin film, and imparts, inter alia, an image, graphic, or pattern to the decorative film. The printed layer can be formed on the second surface of the transparent resin film through, inter alia, inkjet printing, gravure printing, electrostatic printing, offset printing, or screen printing using a solvent-based ink, water-based ink, or UV ink. The printed layer may be applied on the entire second surface or on only a portion of the second surface of the transparent resin film.

Generally, when a solvent-based ink is used, the thickness of the printed layer can be set to approximately 1 µm or greater, or approximately 2 µm or greater, and approximately 10 µm or less, or approximately 5 µm or less, and when a UV ink is used, the thickness of the printed layer can be set to approximately 1 µm or greater, or approximately 5 µm or greater, and approximately 50 µm or less, or approximately 30 µm or less.

A colored adhesive layer is disposed on or above the printed layer. In one embodiment, the colored adhesive layer is a pressure-sensitive adhesive layer. A "colored adhesive layer disposed on the printed layer" means that the colored adhesive layer is disposed in direct contact with the printed layer, and a "colored adhesive layer disposed above the printed layer" means that the colored adhesive layer is disposed via another layer such as a reinforcing layer for example, without directly contacting the printed layer. The definitions for "on" and "above" mentioned in the present disclosure with regard to other layers are the same as that described above.

The colored adhesive layer generally contains a tacky adhesive polymer as an adhesive component. The tacky adhesive polymer may be a known tacky adhesive polymer such as an acrylic resin, polyurethane, polyolefin, polyester, rubber-based resin, silicone-based resin, and a vinyl acetate-based resin. The tacky adhesive polymer may be cross-linked. The colored adhesive layer may further contain a tackifier.

The colored adhesive layer may contain an achromatic pigment such as a white pigment, a black pigment, or a mixture thereof; a chromatic pigment such as a yellow pigment, a red pigment, a green pigment, a blue pigment, or an orange pigment; or combinations thereof. These pigments may be directly dispersed in the tacky adhesive polymer, or may be dispersed in the colored adhesive layer using an acrylic resin or other polymer binder as a dispersant.

The thickness of the colored adhesive layer can be set to approximately 5 μm or greater, approximately 10 μm or greater, or approximately 15 μm or greater, and approximately 60 μm or less, approximately 50 μm or less, or approximately 40 μm or less. By setting the thickness of the colored adhesive layer to the above-mentioned range, a decorative film excelling in flame retardancy or non-flammability can be obtained.

The colored adhesive layer desirably has a capability of concealing a base. In several embodiments, the total light transmittance of the colored adhesive layer in a wavelength range of from 400 to 700 nm is 0% or greater, approximately 1% or greater, or approximately 2% or greater, and approximately 20% or less, approximately 15% or less, or approximately 10% or less.

Besides the transparent resin film, printed layer, and colored adhesive layer, the decorative film may further contain an optional layer including, for example, a metal layer, a surface protection layer, and a reinforcing layer. These layers may be bonded through a bonding layer containing an adhesive.

In one embodiment, the decorative film includes a transparent resin film, a printed layer, and a colored adhesive layer, and does not include other layers. This embodiment is the simplest laminated structure with regard to the decorative film of the present disclosure, and can more effectively increase the flame retardancy or non-flammability of the decorative film.

The thickness of the decorative film can be set to approximately 50 μm or greater, approximately 60 μm or greater, or approximately 70 μm or greater, and approximately 210 μm or less, approximately 180 μm or less, or approximately 150 μm or less. By setting the thickness of the decorative film to the range described above, a decorative film excelling in flame retardancy or non-flammability can be obtained.

In several embodiments, the total calorific value of the decorative film in a cone calorimeter exothermic test in accordance with ISO 5660-1 is approximately 8 MJ/m$^2$ or less, approximately 7 MJ/m$^2$ or less, or 6 MJ/m$^2$ or less. If the total calorific value is 8 MJ/m$^2$ or less, the decorative film is determined to be non-flammable.

The pre-mask includes: a support film having a first surface and a second surface opposite the first surface, and a pressure-sensitive adhesive layer that has an uneven surface and is disposed on the first surface of the support film.

The support film desirably has: rigidity of an extent that can prevent breakage, deviation, and the like of the decorative film when the decorative film is applied to an adherend, and flexibility of an extent at which the pre-mask can be detached and removed from the decorative film without damaging the decorative film after application. Examples of the support film include films containing polyethylene, polypropylene, or other such polyolefins, polyvinyl chloride, polyethylene terephthalate, or other such polyesters, polyurethanes, acrylic resins, fluorine-based polymers, or blends thereof.

The support film may be transparent, semi-transparent, or non-transparent, and may be colorless or colored. In embodiments in which the support film is transparent or semi-transparent, and particularly transparent, one or a plurality of decorative films that are adjacent to each other can be applied to an adherend such that the image, graphic, pattern, and the like of the printed layer are in the proper position and orientation when viewed.

A yield elastic modulus of the support film can generally be set to approximately 10 MPa or greater, approximately 30 MPa or greater, or approximately 50 MPa or greater, and approximately 300 MPa or less, approximately 250 MPa or less, or approximately 200 MPa or less. By setting the yield elastic modulus of the support film to the range described above, the decorative film can be applied to the adherend with high precision using a pre-mask, and the pre-mask can be easily detached and removed after application.

The thickness of the support film can be generally set to approximately 10 μm or greater, approximately 20 μm or greater, or approximately 30 μm or greater, and approximately 100 μm or less, approximately 80 μm or less, or approximately 60 μm or less.

The pressure-sensitive adhesive layer has an uneven surface. The uneven surface of the pressure-sensitive adhesive layer can be formed by using a pressure-sensitive adhesive containing tacky adhesive microspheres dispersed in a tacky adhesive binder. A liner with a release surface having an uneven structure may be prepared, and a pressure-sensitive adhesive may be applied to the release surface of the liner and heat cured if necessary to form the uneven surface on the pressure-sensitive adhesive layer. In this case, the uneven structure (negative structure) of the liner is transferred to the surface of the pressure-sensitive adhesive layer that is in contact with the liner (the surface thereof serving as the adhesive surface of the decorative film), and an uneven adhesive surface having a predetermined structure (positive structure) is formed on the adhesive surface.

In one embodiment, the pressure-sensitive adhesive layer includes tacky adhesive microspheres and a tacky adhesive binder.

Known resins such as acrylic resins, polyurethanes, polyolefins, polyesters, rubber resins, silicone resins, and vinyl acetate resins can be used as the tacky adhesive binder. The tacky adhesive binder may include a tackifier and may be crosslinked.

The tacky adhesive microspheres can contain an acrylic resin, silicone resin, polyurethane, vinyl acetate resin, fluororesin, polyamide, polyvinyl chloride, polystyrene, phenolic resin, epoxy resin, styrene-butadiene-styrene block copolymer, styrene-ethylene-butylene-styrene block copolymer, styrene-isoprene-styrene block copolymer, nitrile rubber, chloroprene rubber, or natural rubber. Tacky adhesive microspheres containing an acrylic resin exhibit high weather resistance, and the tacky adhesiveness can be easily controlled, and therefore such microspheres can be advantageously used.

The volume average particle size of the tacky adhesive microspheres can be selected, as appropriate, according to the size of the embossing of the transparent resin film, and can be, for example, approximately 5 μm or greater, approximately 10 μm or greater, or approximately 20 μm or greater, and approximately 150 μm or less, approximately 100 μm or less, or approximately 50 μm or less. By setting the volume average particle size of the tacky adhesive microspheres to the range described above, the uneven portion of the pressure-sensitive adhesive layer generated due to the presence of the tacky adhesive microspheres tracks the recess portions of the embossing of the transparent resin film and thereby fits in the recess portions, and therefore the adhesive force required to support the decorative film by the pre-mask can be effectively obtained, and the uneven shape of the embossing of the decorative film can be favorably maintained. In one embodiment, the volume average particle size of the tacky adhesive microspheres is smaller than the depth or width of the recess portions of the embossing. The volume average particle size of the tacky adhesive microspheres can be measured using a laser diffraction particle size analyzer, for example, Beckman Coulter LS230.

Since the solvent resistance is excellent, it is advantageous that the tacky adhesive microspheres are crosslinked particles. Solid particles, hollow particles, or porous particles can be used as the tacky adhesive microspheres. The tacky adhesive microspheres may include clusters formed by aggregating a plurality of microspheres.

In one embodiment, the adhesive microspheres are contained in the pressure-sensitive adhesive layer in an amount of approximately 5 parts by mass or greater, approximately 10 parts by mass or greater, or approximately 15 parts by mass or greater, and approximately 900 parts by mass or less, approximately 700 parts by mass or less, or approximately 500 parts by mass or less, per 100 parts by mass of the tacky adhesive binder. By setting the content of the tacky adhesive microspheres to the range described above, an uneven surface that exhibits good adhesion to the embossed surface can be formed on the pressure-sensitive adhesive layer.

The dry mass of the pressure-sensitive adhesive layer can be approximately 5 g/m² or greater, approximately 10 g/m² or greater, or approximately 15 g/m² or greater, and approximately 200 g/m² or less, approximately 150 g/m² or less, or approximately 100 g/m² or less.

The construction member can be manufactured using known methods. An exemplary manufacturing method is described below.

A pressure-sensitive adhesive containing the tacky adhesive microspheres and the tacky adhesive binder, and as necessary, a solvent or the like, is applied to a support film using a knife coater, gravure coater, bar coater, or the like, and then dried by heating as necessary to form a pressure-sensitive adhesive layer having an uneven surface on the support film. Prior to the formation of the pressure-sensitive adhesive layer, a primer layer may be formed on the support film as necessary, and the support film may be subjected to a surface treatment such as a corona treatment or flame treatment. Subsequently, the pressure-sensitive adhesive layer and the first surface (embossed surface) of the transparent resin film are adhered in a manner facing each other to thereby produce the transparent film for backside printing (BSPC, BackSide Printable Clear) as an intermediate body. The transparent film for backside printing may be a sheet with a predetermined shape, or may be wound as a continuous roll.

A printed layer is formed on the transparent resin film of the transparent film for backside printing through inkjet printing, gravure printing, electrostatic printing, offset printing, screen printing, or the like using a solvent-based ink, a water-based ink, or UV ink.

A colored adhesive is applied using a knife coater, a gravure coater, a bar coater, or the like, to a liner having a silicone treatment or the like, and then dried by heating as necessary to form a colored adhesive layer on the liner. A construction member is produced by affixing the colored adhesive layer to a printed layer on a transparent resin film.

The construction member may include a liner used in the manufacturing process on the colored adhesive layer, and another liner may be disposed on the colored adhesive layer.

FIG. 1 illustrates a schematic cross-sectional view of a construction member of one embodiment obtained in this manner. A construction member 10 includes a decorative film 20 and a pre-mask 30. The decorative film 20 includes a transparent resin film 22, a printed layer 24, and a colored adhesive layer 26, and a liner 40 is disposed on the colored adhesive layer 26. The transparent resin film 22 is embossed on a first surface (the upper surface in FIG. 1), and the printed layer 24 is disposed on a second surface (the lower surface in FIG. 1). The pre-mask 30 includes a support film 32 and a pressure-sensitive adhesive layer 34, and the pressure-sensitive adhesive layer 34 includes a tacky adhesive binder 36 and tacky adhesive microspheres 38, and has an uneven surface. The first surface, or in other words, the embossed surface of the transparent resin film 22 of the decorative film 20, faces the uneven surface of the pressure-sensitive adhesive layer 34 of the pre-mask 30.

Figure 2:
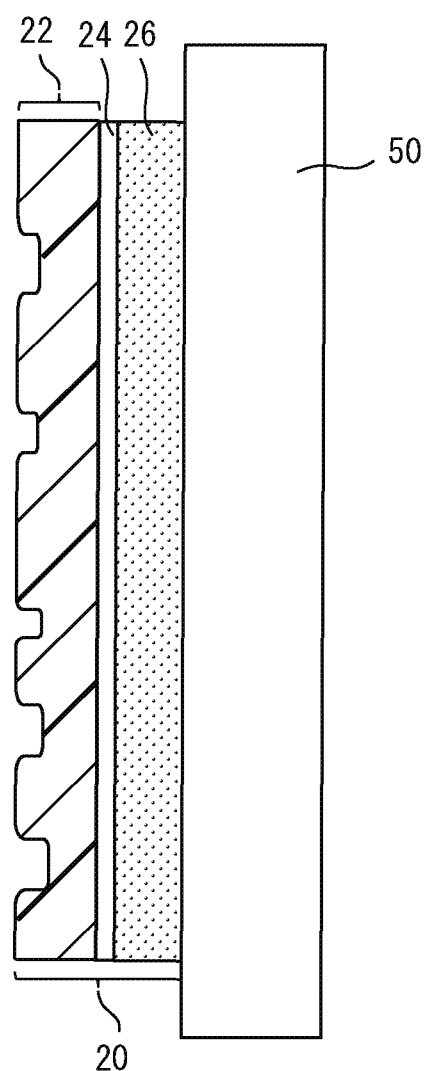
FIG. 2 is a schematic cross-sectional view of a decorative film applied to an adherend.

The decorative film 20 can be applied to an adherend 50 such as an inner wall or outer wall of a building by: removing the liner 40 from the construction member 10, aligning, using the pre-mask 30, the position and orientation of the decorative film 20 with respect to the adherend 50, adhering the construction member 10 via the colored adhesive layer 26, and then removing the pre-mask 30. FIG. 2 illustrates a schematic cross-sectional view of the decorative film 20 applied to the adherend 50.

Figure 3:
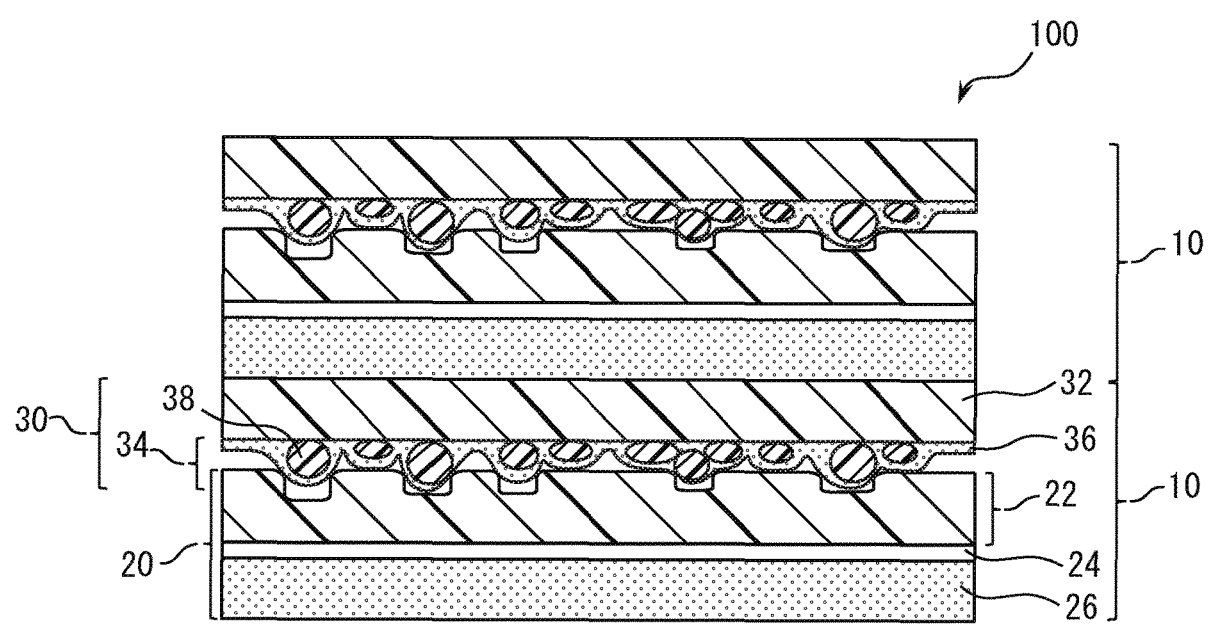
FIG. 3 is a schematic cross-sectional view of a construction member stack including a plurality of construction members according to one embodiment of the present disclosure.

In one embodiment, the construction member is such that the second surface of the support film has a release treatment, and the construction member is in the form of a roll that is wound such that the second surface of the support film is in contact with the colored adhesive layer. In another embodiment, a construction member stack including two or more construction members is provided, wherein the second surface of the support film has a release treatment, and the construction members are laminated such that the second surface of the support film of a first construction member is in contact with the colored adhesive layer of a second construction member. In these embodiments, the support film of the pre-mask also functions as a liner, allowing for a weight reduction of the construction member or construction member stack, a reduction of waste after construction, and the like. FIG. 3 illustrates a schematic cross-sectional view of a construction member stack 100 including a plurality of construction members 10. In FIG. 3, the reference numerals of constituent elements of the (second) construction member 10 on the upper side are omitted.

The construction members of the present disclosure can be suitably used for decorative purposes on, inter alia, inner walls and outer walls of buildings.

EXAMPLES

Specific embodiments of the present disclosure are exemplified in the following examples, but the present invention is not limited to these embodiments. All parts and percentages are based on mass, unless otherwise stated.

The materials used in the present examples are shown in Table 1.

TABLE 1

| | Composition or Description | Glass transition temperature Tg (° C.) | Weight average molecular weight Mw | Solvent | Solid Content (mass %) |
|---|---|---|---|---|---|
| Acrylic resin 1 (Ap1) | MMA-BMA-DMAEMA = 60:34:6 | 63 | 68.000 | Ethyl acetate | 40 |
| Acrylic resin 2 (Ap2) | BA-2EHA-Vac-AA-ACM = 40:47:8:5:0.1 | −51 | 550.000 | Toluene/ethyl acetate | 40 |
| Tacky adhesive microspheres 1 (MSA1) | IOA-AA-1,4BDA = 94:6:0.025, Volume average particle size 35 μm, solid microspheres | −49 | — | Water | 40 |
| Tacky adhesive agent 1 (ADH1) | Acrylic emulsion tacky adhesive, SK Dyne E - 313, Soken Chemical & Engineering Co., Ltd. (Toshima-ku, Tokyo, Japan) | — | — | Water | 55 |
| Tacky adhesive 2 (ADH2) | BA-2EHA-AN-AA = 58:36:2:4 | −53 | 500.000 | ethyl acetate | 33 |
| Crosslinking agent 1 (CL1) | Epoxy crosslinking agent, E-AX, Soken Chemical & Engineering Co., Ltd. (Toshima-ku, Tokyo, Japan) | — | — | Toluene | 5 |
| Crosslinking agent 2 (CL2) | Bisamide crosslinking agent, 1,1'-isophthaloyl-bis (2-methyl aziridine), 3M Japan Limited (Shinagawa-ku, Tokyo, Japan) | — | — | Toluene | 5 |

MMA: methyl methacrylate
BMA: butyl methacrylate
DMAEMA: dimethylaminoethyl methacrylate
BA: n-butyl acrylate
2 EHA: 2-ethylhexyl acrylate
Vac: vinyl acetate
AA: acrylic acid
ACM: Acrylamide
IOA: Isooctyl acrylate
1,4BDA: 1,4-butanediol diacrylate
AN: Acrylonitrile

TABLE 2

Table 2

| | Color | C. I. | Product Name and Manufacturer |
|---|---|---|---|
| Pigment 1 | White | | TiPure (trademark) R960, titanium dioxide ($TiO_2$), The Chemours Company (Wilmington, DE, USA), |
| Pigment 2 | Orange | Pigment Orange 61 | CROMOPHTAL ORANGE 2G, BASF Co., Ltd. (Ludwigshafen am Rhein, Rheinland-Pfalz, Germany) |
| Pigment 3 | Yellow | Pigment Yellow 154 | IRGAZIN (trademark) YELLOW 2 GLTE, BASF Co., Ltd. (Ludwigshafen am Rhein, Rheinland-Pfalz, Germany) |
| Pigment 4 | Black | Pigment Black 7 | Raven (trademark) Carbon Black 1200, BIRLA CARBON (Mumbai, Maharashtra, India) |

TABLE 3

Table 3

| | Pigment | Dispersant | Pigment Concentration (mass %) | Dispersant Concentration (mass %) |
|---|---|---|---|---|
| Mill Base 1 (MB1) | Pigment 1 | Acrylic resin 1 | 55 | 11 |
| Mill Base 2 (MB2) | Pigment 2 | Acrylic resin 2 | 10 | 16 |
| Mill Base 3 (MB3) | Pigment 3 | Acrylic resin 2 | 10 | 16 |
| Mill Base 4 (MB4) | Piament 4 | Acrylic resin 2 | 5 | 20 |

TABLE 4

Table 4

| | Mass % (solution) |
|---|---|
| MB1 | 5.56 |
| MB2 | 10.6 |
| MB3 | 10.99 |
| MB4 | 1.49 |
| ADH2 | 69.34 |
| AP1 | 2.02 |

Example 1

1. Preparation of Transparent Film for Backside Printing (BSPC, BackSide Printable Clear)

A solvent-based carbodiimide primer was applied onto a polyester film having a thickness of 50 μm using a gravure coater. The primer layer was dried at 65° C. for 1 minute. A mixed solution of MSA1, ADH1, and CL1 was prepared as a pressure-sensitive adhesive solution. The blending ratio in terms of solid content was MSA1:ADH1:CL1=20:80:0.08. The pressure-sensitive adhesive solution was applied onto the primer layer with a notch bar. The pressure-sensitive adhesive layer was dried at 95° C. for 5 minutes. The coating weight of the pressure-sensitive adhesive layer after drying was 40 g/m². The pressure-sensitive adhesive layer and the embossed surface of the embossed transparent polyvinyl chloride film having a thickness of 80 μm (mass per unit area of 99 g/m²) were adhered facing each other. The embossed shape was an "ash" wood grain pattern (embossing maximum depth of 48 μm and embossing area (recess portion) of 57%). In this manner, a transparent film for backside printing supported by a pre-mask was produced.

2. Inkjet Printing

The wood grain pattern was printed onto the transparent polyvinyl chloride film of the transparent film for backside printing using a UV inkjet printer (UJV500, Mimaki Engineering Co., Ltd., Tomi-shi, Nagano-ken, Japan). LUS-200 (3M Japan Limited (Shinagawa-ku, Tokyo, Japan)) was used as the TV ink.

3. Production of Colored Adhesive Layer

A colored adhesive was prepared according to Table 4. The colored adhesive was applied to a silicone treated surface of a double-sided polyethylene laminate release sheet using a notch bar. The colored adhesive layer was dried at 95° C. for 3 minutes. The coating thickness of the colored adhesive layer after drying was 38 μm. The colored adhesive layer was affixed to an inkjet printed surface of a transparent polyvinyl chloride film, and a construction member of Example 1 was thereby obtained.

The pre-mask was detached from the decorative film of the obtained construction member, a primer solution DP900N3 (3M Japan Limited (Shinagawa-ku, Tokyo, Japan)) was coated on a calcium silicate plate (thickness of 6 mm) in order to increase the adhesiveness of the decorative film, and the decorative film was affixed thereon. A test based on the cone calorimeter exothermic test was performed in accordance with ISO5660-1. The heat generation rate (kW/m$^2$) and the total calorific value (MJ/m$^2$) were measured as parameters using a cone calorimeter (Toyo Seiki Seisaku-sho, Ltd., Kita-ku, Tokyo, Japan). Cases in which the total calorific value in a 20 minute period after the startup of heating was 8 MJ/m$^2$ or less, and the time in which a heat generation rate exceeding 200 kW/m$^2$ was exhibited was 10 seconds or less in total were determined to be passing, and cases other than this were determined to be failing. The flame retardancy of the decorative film was evaluated through a cone calorimeter exothermic test in accordance with ISO 5660-1, and according to the results, the time in which a heat generation rate exceeding 200 kW/m$^2$ was exhibited was 0 seconds, and the total calorific value was 5.5 MJ/m$^2$, and thus it was determined that the decorative film was non-flammable.

Example 2

A construction member of Example 2 was obtained in the same manner as in Example 1 with the exception that the transparent polyvinyl chloride film having a thickness of 80 μm was changed to a transparent polyvinyl chloride film having a thickness of 135 μm (mass per unit area of 165 g/m$^2$), and the embossing was changed to a "vibe" wood grain pattern (embossing maximum depth of 63 μm and embossing area (recess portion) of 75%). The pre-mask was detached from the decorative film of the obtained construction member, and the flame retardancy of the decorative film was evaluated through the cone calorimeter exothermic test in accordance with ISO 5660-1 in the same manner as in Example 1, and according to the results, the time in which a heat generation rate exceeding 200 kW/m$^2$ was exhibited was 0 seconds, and the total calorific value was 7.0 MJ/m$^2$, and thus it was determined that the decorative film was non-flammable.

The invention claimed is:

1. A construction member comprising:
   a decorative film comprising:
      a transparent resin film having an embossed first surface and a second surface opposite the first surface, wherein an embossing depth of the first surface of the transparent resin film is less than the thickness of the transparent resin film and is from 1 μm to 80 μm,
      a printed layer disposed on the second surface of the transparent resin film, and
      a colored adhesive layer disposed on or above the printed layer; and
   a pre-mask that is laminated to the decorative film and removed after application of the decorative film, wherein the pre-mask comprises:
      a support film having a first surface and a second surface opposite the first surface, and
      a pressure-sensitive adhesive layer having an uneven surface and being disposed on the first surface of the support film,
   wherein the first surface of the transparent resin film of the decorative film and the uneven surface of the pressure-sensitive adhesive layer of the pre-mask face each other,
   wherein the pressure-sensitive adhesive layer comprises:
      tacky adhesive microspheres having a volume average particle size of 5 μm or greater and 150 μm or less sized to fit in recesses of the embossed first surface of the transparent resin film, and
      a tacky adhesive binder.

2. The construction member according to claim 1, wherein a thickness of the transparent resin film is from 30 μm to 160 μm.

3. The construction member according to claim 1, wherein a thickness of the decorative film is from 50 μm to 210 μm.

4. The construction member according to claim 1 wherein a total calorific value of the decorative film in a cone calorimeter exothermic test in accordance with ISO 5660-1 is 8 MJ/m$^2$ or less.

5. The construction member according to claim 1, wherein the transparent resin film is a polyvinyl chloride film.

6. The construction member according to claim 1, wherein the volume average particle size of the tacky adhesive microspheres is smaller than a depth of recess portions of the embossing.

7. The construction member according to claim 1, wherein the tacky adhesive microspheres comprise at least one material selected from the group consisting of acrylic resins, silicone resins, polyurethanes, vinyl acetate resins, fluororesins, polyamides, polyvinyl chlorides, polystyrenes, phenolic resins, epoxy resins, styrene-butadiene-styrene block copolymers, styrene-ethylene-butylene-styrene block copolymers, styrene-isoprene-styrene block copolymers, nitrile rubbers, chloroprene rubbers, and natural rubbers.

8. The construction member according to claim 1, wherein the pressure-sensitive adhesive layer comprises from 5 to 900 parts by mass of the tacky adhesive microspheres per 100 parts by mass of the tacky adhesive binder.

9. The construction member according to claim 1, wherein the second surface of the support film has a release treatment, and is in the form of a roll that is wound so that the second surface of the support film and the colored adhesive layer are in contact.

10. A construction member stack comprising two or more construction members described in claim 1, wherein the second surface of the support film has a release treatment, and the construction members are laminated such that the second surface of the support film of a first construction member is in contact with the colored adhesive layer of a second construction member.

\* \* \* \* \*